(12) United States Patent
Otto

(10) Patent No.: US 7,742,270 B2
(45) Date of Patent: Jun. 22, 2010

(54) SYSTEM AND METHOD FOR LIMITING ENERGY IN AN INDUSTRIAL CONTROL SYSTEM

(75) Inventor: Kurt J. Otto, Laguna Beach, CA (US)

(73) Assignee: Invensys Systems, Inc., Foxboro, MA (US)

( * ) Notice: Subject to any disclaimer, the term of this patent is extended or adjusted under 35 U.S.C. 154(b) by 776 days.

(21) Appl. No.: 11/141,920

(22) Filed: Jun. 1, 2005

(65) Prior Publication Data

US 2005/0276102 A1    Dec. 15, 2005

Related U.S. Application Data

(60) Provisional application No. 60/578,808, filed on Jun. 10, 2004.

(51) Int. Cl.
*H02H 5/04* (2006.01)

(52) U.S. Cl. .................. 361/106; 361/93.8; 361/103

(58) Field of Classification Search ............. 361/93.8, 361/103, 106
See application file for complete search history.

(56) References Cited

U.S. PATENT DOCUMENTS

| | | | |
|---|---|---|---|
| 3,584,190 A | 6/1971 | Marcoux | |
| 3,973,170 A | 8/1976 | Hogan | |
| 4,099,216 A | 7/1978 | Weberg | |
| 4,255,698 A | 3/1981 | Simon | |
| 4,329,726 A | 5/1982 | Middleman | |
| 4,518,850 A * | 5/1985 | Grasso | 219/505 |
| 5,144,517 A * | 9/1992 | Wieth | 361/55 |
| 5,365,768 A * | 11/1994 | Suzuki et al. | 73/1.01 |
| 5,530,613 A | 6/1996 | Bauer | |
| 5,995,392 A | 11/1999 | Turner | |
| 6,104,583 A | 8/2000 | Wynn | |
| 6,166,516 A | 12/2000 | Albright | |

(Continued)

FOREIGN PATENT DOCUMENTS

EP        0 877 462 A2    11/1998

(Continued)

OTHER PUBLICATIONS

Hokuriku, PTC Thermistor, Apr. 22, 2003, http://web.archive.org/web/20030422053420/http://www.hdk.co.jp/pdf/eng/e022100.pdf, all pages.*

(Continued)

*Primary Examiner*—Stephen W Jackson
*Assistant Examiner*—Tien Mai
(74) *Attorney, Agent, or Firm*—Cooley LLP

(57) ABSTRACT

A system and method for limiting energy to an industrial control system is described. The method includes receiving a supply voltage, limiting the supply voltage so as to generate a limited voltage, and providing the limited voltage to a field transducer, the field transducer being disposed to monitor a parameter of the industrial process. A field current, that is generated in response to the limited voltage, is received from the field transducer and the field current is indicative of a magnitude of the parameter under normal operating conditions. During a fault condition, the field current is restricted with a variable resistance that is responsive to an amount of thermal energy generated during the fault condition so as to limit an amount of energy drawn by the control system.

13 Claims, 5 Drawing Sheets

U.S. PATENT DOCUMENTS

| | | | |
|---|---|---|---|
| 6,397,322 B1 * | 5/2002 | Voss | 712/35 |
| 2002/0109576 A1 | 8/2002 | Wang | |

FOREIGN PATENT DOCUMENTS

| | | |
|---|---|---|
| JP | 5183350 A2 | 7/1993 |
| JP | 2001006518 A2 | 1/2001 |
| JP | 2001209440 A2 | 8/2001 |
| JP | 2001218361 A2 | 8/2001 |
| WO | WO 97/48159 | 12/1997 |
| WO | WO 99/10903 | 3/1999 |
| WO | WO 02/45985 A2 | 6/2002 |
| WO | WO 02/45985 A3 | 6/2002 |

OTHER PUBLICATIONS

EPCOS; Application Notes; pp. 31-45 plus cover page; published in Oct. 2002.

European Patent Office search report for European patent application No. 05253553.1-2207.

* cited by examiner

SYSTEM AND METHOD FOR LIMITING ENERGY IN AN INDUSTRIAL CONTROL SYSTEM

PRIORITY

The present application claims priority from to commonly owned and assigned application No. 60/578,808, filed Jun. 10, 2004, entitled System and Method for Limiting Energy in an Industrial Control System, which is incorporated herein by reference.

FIELD OF THE INVENTION

The present invention relates generally to control and monitoring systems, and more specifically to industrial process control and monitoring systems.

BACKGROUND OF THE INVENTION

Modern industrial systems and processes tend to be technically complex, involve substantial energies and monetary interests, and have the potential to inflict serious harm to persons or property during an accident. Although absolute protection may not be possible to achieve, risk can be reduced to an acceptable level using various methods to increase an industrial system's safety and reliability and mitigate harm if an event, e.g., a failure, does occur.

Integral with industrial systems are process and safety control systems, which typically include programmable controllers (e.g., programmable logic controllers (PLCs)) and a collection of sensors and actuators for detecting and reacting to events, respectively. Typically, sensors (e.g., temperature, pressure and flow transducers) are coupled to a programmable controller via signal lines that may be hundreds of feet in length. As a consequence, the potential exists for these signal lines to be inadvertently severed or short circuited during an event (e.g., an accidental collision).

During an event arising in the context of hazardous gas atmospheres (e.g., flammable gas atmospheres), electrical and/or thermal energy released from the signal lines, field devices (e.g., sensors) and/or the programmable controller circuitry may create a spark or generate sufficient temperatures to cause the gas atmosphere to ignite. Recognizing these potential hazards, regulations in the United States and Europe mandate that current, voltage and temperature be limited in electronic circuits including programmable controllers that are operating in the presence of the hazardous atmosphere.

Consistent with existing, standardized methodology, power ballast resistors are often employed to limit the amount of current drawn by signal lines. Power ballast resisters, however, are often expensive, and are typically bulky and heavy because they are intended to limit temperatures by absorbing heat with a substantial amount of thermally conductive mass and dissipating the heat with a substantial amount of surface area.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

In one exemplary embodiment, the present invention may be characterized as a method for limiting energy of an industrial process controller, the method including receiving a supply voltage limiting the supply voltage so as to generate a limited voltage, providing the limited voltage to a field transducer that is disposed to monitor a parameter of the industrial process, receiving, from the field transducer, a field current that is generated in response to the limited voltage. The field current in this embodiment, is indicative of a magnitude of the parameter under normal operating conditions. During a fault condition, the field current is restricted with a resistance so as to limit the field current and the generation of thermal energy.

According to another embodiment, the invention may be characterized as a programmable controller for controlling an industrial system. The programmable controller in this embodiment includes a plurality of energy-limiting modules, each of the plurality of energy-limiting modules being configured to provide an output signal indicative of a parameter measured by a corresponding one of a plurality of field devices. Each of the plurality of energy-limiting modules is configured to limit a field current of the corresponding one of a plurality of field devices with a thermally responsive current limiter. A processor is also included to process the output signals from the plurality of energy-limiting modules and provide control signals to actuators of the industrial system in accordance with instructions stored in a memory coupled with the processor.

In another variation, the invention may be characterized as an energy-limiting module for an industrial controller. The energy-limiting module including a first and a second signal lines disposed to provide a voltage to a field transducer, which is associated with a process parameter. A temperature-dependent current limiter is coupled between a supply voltage and the first signal line so as to limit electrical and thermal energy in the event of a fault. A voltage limiter is coupled to the first signal line so as to limit the voltage provided to the field transducer, and a current to voltage translator is coupled to the second signal line to provide an output voltage to the industrial controller that is indicative of the process parameter.

In yet another embodiment, the invention may be characterized as an intelligent field device that includes a transducer configured to draw a field current that is a function of a field parameter, an energy-limiting module configured to limit an amount of energy imparted to the transducer and provide, in response to the field current, an output signal indicative of the field parameter. A processor is also included to process the output signal and to control an actuator that affects the field parameter.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

The aspects, features and advantages of the present invention will be more apparent from the following more particular description thereof, presented in conjunction with the following drawings wherein.

DETAILED DESCRIPTION

In one aspect, the present invention is directed to an energy-limiting system, which limits both the electrical and thermal energy released by a programmable controller, signal lines and field devices in an industrial control application. Specifically, the present invention according to several embodiments employs a combination of voltage, current and temperature control techniques to limit electrical and thermal energy and thereby mitigate risks associated with operating a programmable controller in a flammable gas atmosphere.

Unlike current approaches, which use large, expensive power ballast resistors which are difficult to thermally regulate, several embodiments of the present invention utilize a current limiting technique, which simultaneously limits thermal energy in a well controlled manner without passive or active heat exchange. In addition, voltage control techniques are utilized in conjunction with the current and thermal regulation to mitigate the potential for both overheating and sparks, which may cause a flammable atmosphere to ignite.

Figure 1:
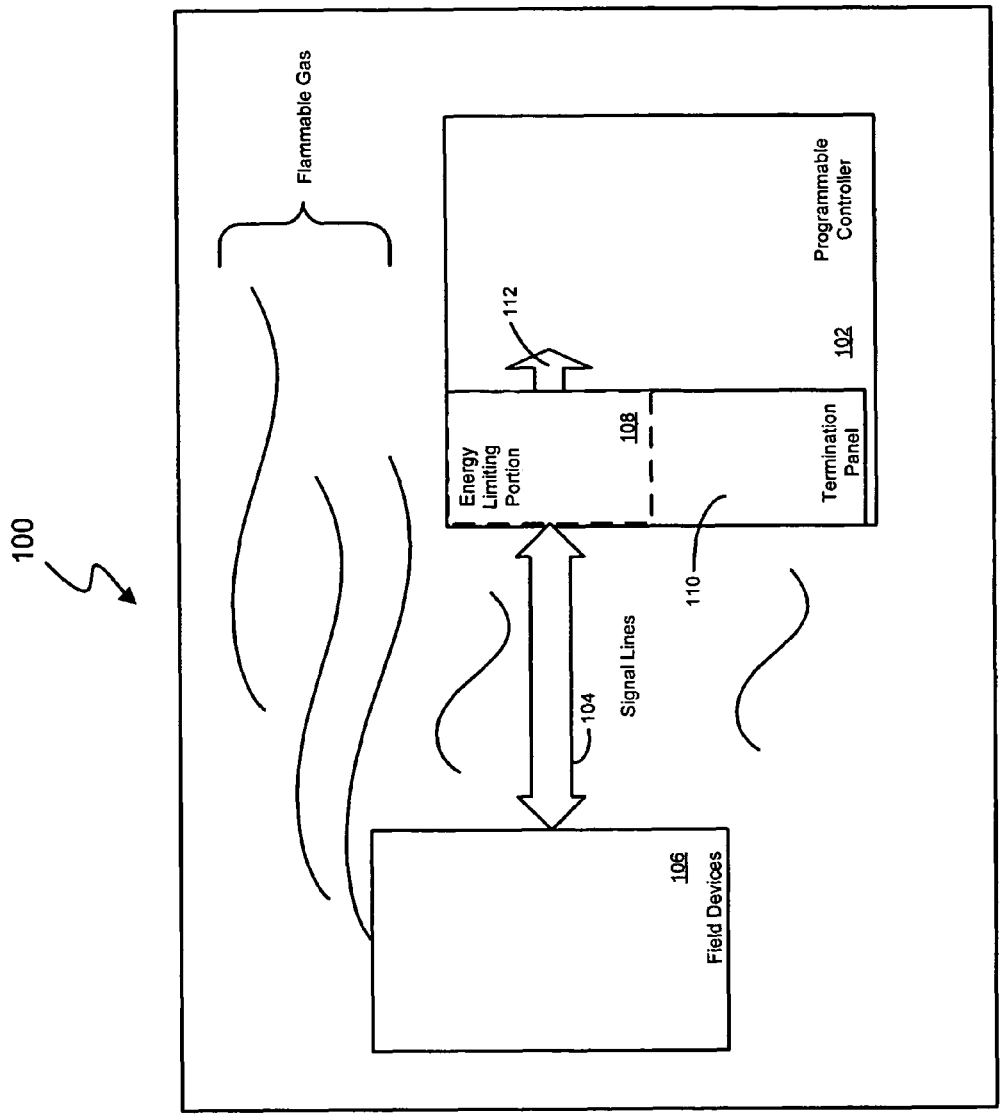
FIG. 1 is a is a block diagram of an exemplary industrial system in which an energy-limiting system according to one embodiment of the present invention is implemented.

Referring first to FIG. 1 shown is a block diagram of an exemplary industrial system 100 in which an energy-limiting system according to an embodiment of the present invention is implemented. As shown, the system 100 includes a programmable controller 102 within a flammable gas atmosphere that is in communication, via a collection of signal lines 104, with field devices 106 (e.g., actuators and sensors). The signal lines 104 are coupled to the programmable controller 102 via an energy-limiting portion 108 of a termination panel 110. As shown, the energy-limiting portion 108 also provides output signals 112 that are utilized by the programmable controller 102 to control one or more aspects of the system 100.

The programmable controller 102 may be realized using any one of a variety of devices that have input/output (I/O) functionality and processing capability (not shown). The programmable controller 102 may be, for example and without limitation, a safety controller, a programmable logic controller (PLC), a general purpose computer, or potentially any other device that includes a processor, memory and input/output capability.

Although the programmable controller 102 is depicted in FIG. 1 as a separate unit from the field devices 106, it is contemplated that each field device may be integrated with a programmable controller so as to realize separate intelligent field devices with the energy limiting functionality described herein.

In the present embodiment, the energy-limiting portion 108 of the termination panel 110 limits energy to the signal lines 104, the field devices 106 and a portion of the programmable controller 102 so as to reduce the likelihood of a spark or over temperature condition occurring when there are faults in the field devices 106 and/or signal lines 104.

Figure 2:
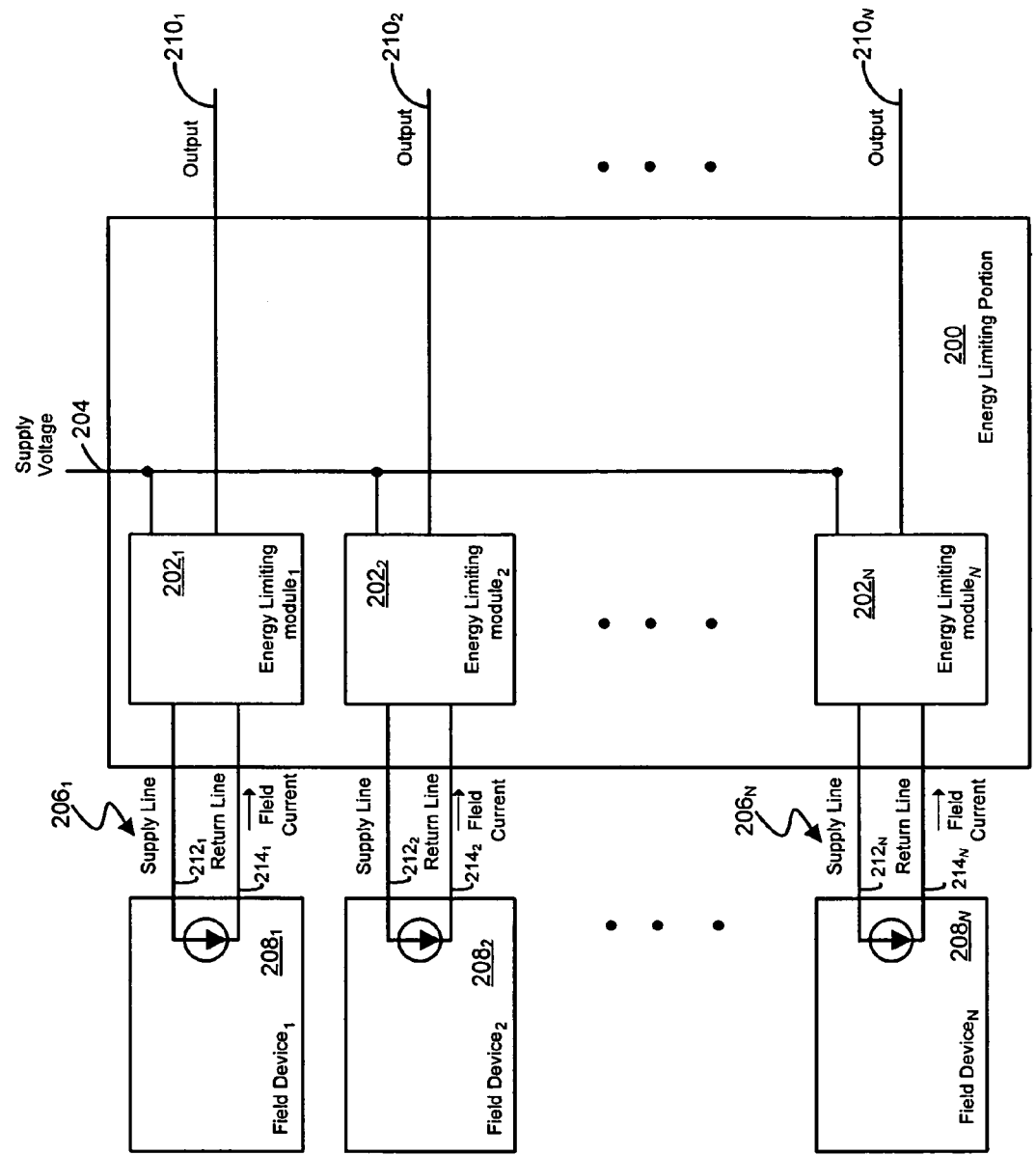
FIG. 2 is a block diagram of an exemplary embodiment of the energy-limiting portion of FIG. 1.

Referring next to FIG. 2, shown is a block diagram of an exemplary embodiment of the energy-limiting portion of FIG. 1. As shown, the energy-limiting portion 200 in the present embodiment includes N energy-limiting modules $202_{1-N}$, which are coupled to a supply voltage 204. In addition, each of the N energy-limiting modules $202_{1-N}$ is shown coupled, via a corresponding pair of signal lines $206_{1-N}$, to a corresponding one of N field devices $208_{1-N}$, and each energy-limiting module provides one of N output signals $210_{1-N}$ shown extending from the energy-limiting portion 200.

In the exemplary embodiment, each of the energy-limiting modules $202_{1-N}$ has two signal lines $206_{1-N}$, (a supply line $206_{1-N}$ and a return line $214_{1-N}$), which set up a voltage across each respective field device $208_{1-N}$, and in response, each field device $208_{1-N}$ generates a field current indicative of a field parameter (e.g., environmental or process condition) that each field device is monitoring. For example, the field devices $208_{1-N}$ may be temperature, pressure or flow transducers that generate respective field currents that are proportional to monitored temperature, pressure and flow rates.

In operation, each energy-limiting module $202_{1-N}$ receives the supply voltage 204 and implements voltage, current and thermal limiting techniques to limit the amount of energy released in the flammable gas environment in the event of one or more faults among the signal lines $206_{1-N}$ and/or field devices $208_{1-N}$ of the industrial system 100. In this way, a potentially unlimited amount of energy from the supply voltage 204 is electrically and thermally limited.

For example, the voltage to the field devices $208_{1-N}$ is limited to reduce the likelihood that a spark ignition-level energy will be generated if a signal line $206_{1-N}$ brushes against a conductive element (e.g., a ladder or a portion of a misguided fork lift). In addition, current to the field devices $208_{1-N}$ is limited so that if the supply signal line $212_{1-N}$ experiences a ground fault or there is a short circuit between the signal lines $206_{1-N}$, dangerous levels of heat energy are not generated in the flammable atmosphere. Moreover, each energy-limiting module $202_{1-N}$ in the exemplary embodiment includes thermal limiting capability so as to prevent the terminal panel 110 itself from reaching a flash point level.

Figure 3:
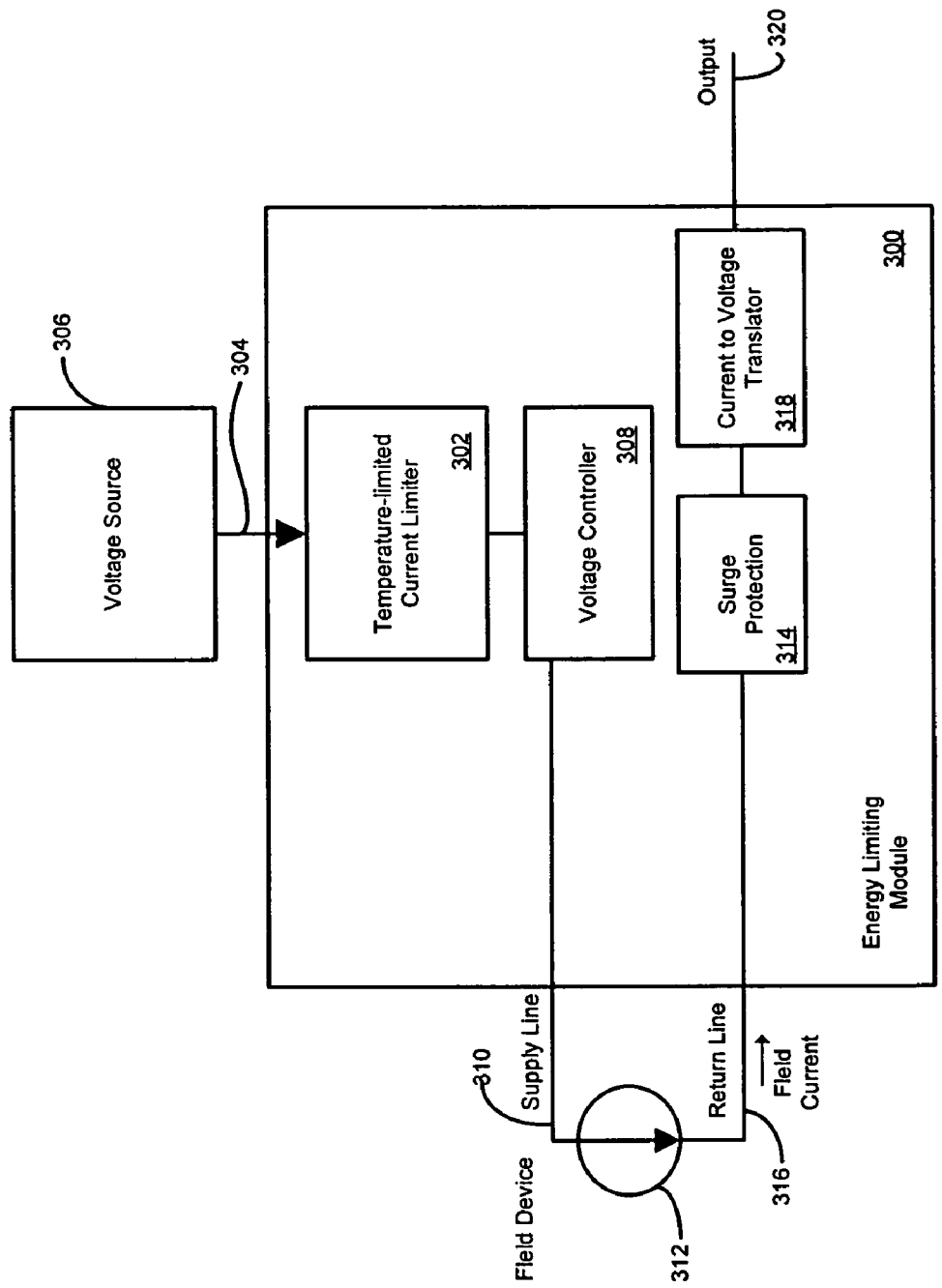
FIG. 3 is a block diagram of an exemplary embodiment of the energy-limiting module of FIG. 2.

Referring next to FIG. 3, shown is an energy limiting module 300, which is an exemplary embodiment of one or more of the energy-limiting modules $202_{1-N}$ described with reference to FIG. 2. As shown, a temperature controlled current limiter 302 of the energy-limiting module 300 receives a supply voltage 304 from a voltage source 306. The temperature controlled current limiter 302 is coupled to a voltage controller 308, which is coupled via a supply signal line 310 to a field device 312. A surge protection portion 314 of the energy-limiting module 300 is also coupled to the field device 312 via a return signal line 316, and an output of the surge protector 314 is provide to a current to voltage translator 318.

In operation, the energy-limiting module 300 receives the supply voltage 304 from the voltage source 306, and the temperature controlled current limiter 302 functions to limit the amount of current drawn from the voltage source 306 while simultaneously limiting the amount of thermal energy dissipated. The voltage controller 308 operates to provide a limited voltage via the supply line 310 to the field device 312 so as to reduce the likelihood that any sparks generated during an event will have sufficient energy to ignite the surrounding flammable atmosphere.

As shown, when the limited voltage is applied to the field device 312, the field device 312 generates a field current 316 that is returned to the surge protection portion 314, which protects the current to voltage translator 318 from power surges. The current to voltage translator 318 then converts the field current to an output voltage 320, which is provided to the programmable controller 102.

Figure 4:
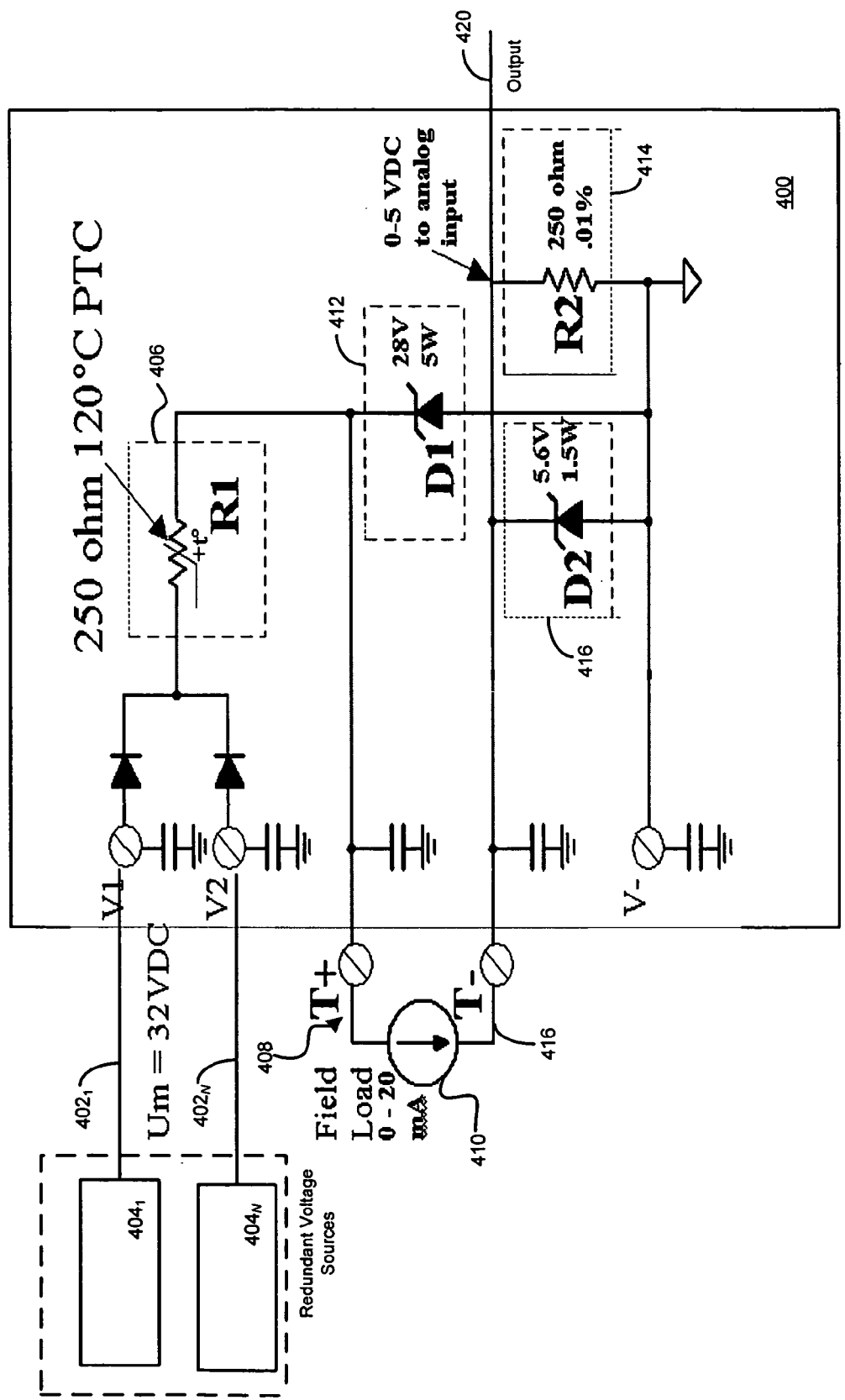
FIG. 4 depicts a schematic diagram of one embodiment of the energy-limiting module of FIG. 3.

Referring next to FIG. 4, shown is a schematic view of an energy limiting module 400, which is one embodiment of the energy-limiting module 300 of FIG. 3. As shown, in the present embodiment the energy-limiting module 400 includes two inputs (i.e., V1 and V2), which are disposed to receive a supply voltage $402_{1-N}$ from respective redundant voltage sources $404_{1-N}$ and provide the supply voltage $402_{1-N}$ to a temperature controlled current limiter, which in the present embodiment includes a positive temperature coefficient (PTC) resistor 406.

Under normal operating conditions, the PTC resistor 406 operates at 250 ohms with a current that varies between 0 to 20 mA depending upon the parameter monitored by the field device (e.g., field devices $208_{1-N}$). In the event the supply signal 408 is shorted to either the return signal line 416 or ground, the current through the PTC resistor 406 will quickly rise due to its relatively low resistance.

As a consequence, the amount of thermal energy dissipated by the PTC resistor 406 will quickly increase until the temperature of the PTC resistor 406 reaches 120° C. Once the temperature of the PTC resistor reaches 120° C., the resistance of the PTC resistor 406 rapidly increases in response to any further increases in temperature over 120° C. In turn, the rapid increase in resistance limits the current flowing through the PTC resistor 406 so as to prevent a further increase in the temperature of the PTC resistor 406. In this way, the PTC resistor 406 limits current to the signal lines $206_{1-N}$, 310, 316, 408, 416 and field devices $208_{1-N}$, 312, 410 while simultaneously limiting the amount of thermal energy generated in the energy-limiting module.

It should be recognized that PTC resistors with various operating characteristics may be implemented in accordance with the particular operating environment. For example, a PTC resistor may be implemented that increases resistance at a temperature lower than 120° C. if the energy-limiting module 400 is employed in a gaseous environment having a relatively low flash point.

As shown, the voltage controller 308 in the present embodiment is realized by a 28V zener diode 412, which limits the field voltage to 28 volts in the event a user applies a supply voltage 402 that is greater than 28 volts. It should be recognized that the 28 volt field voltage is merely exemplary and that other voltages may be utilized depending upon the field devices and the particular type of atmosphere in which the energy-limiting module 400 is employed.

As shown, the current to voltage translator in the present embodiment is realized by a 250 ohm resistor 414, and a 5.6 volt zenor diode 416 is employed as the surge protector to prevent damage to the resistor 414 in the event of a fault.

Although the energy-limiting module 400 depicted in FIG. 4 is shown as an analog module, it should be recognized that several embodiments of the present invention extend to digital applications as well. For example, to provide a digital output to a programmable controller (e.g., the programmable controller 102), the resistance R2 of the current to voltage translator 414 may be changed (e.g., to 2K ohms). In such an embodiment, the surge protection portion 416 is less important and D2 may be removed from the embodiment shown in FIG. 4.

Figure 5:
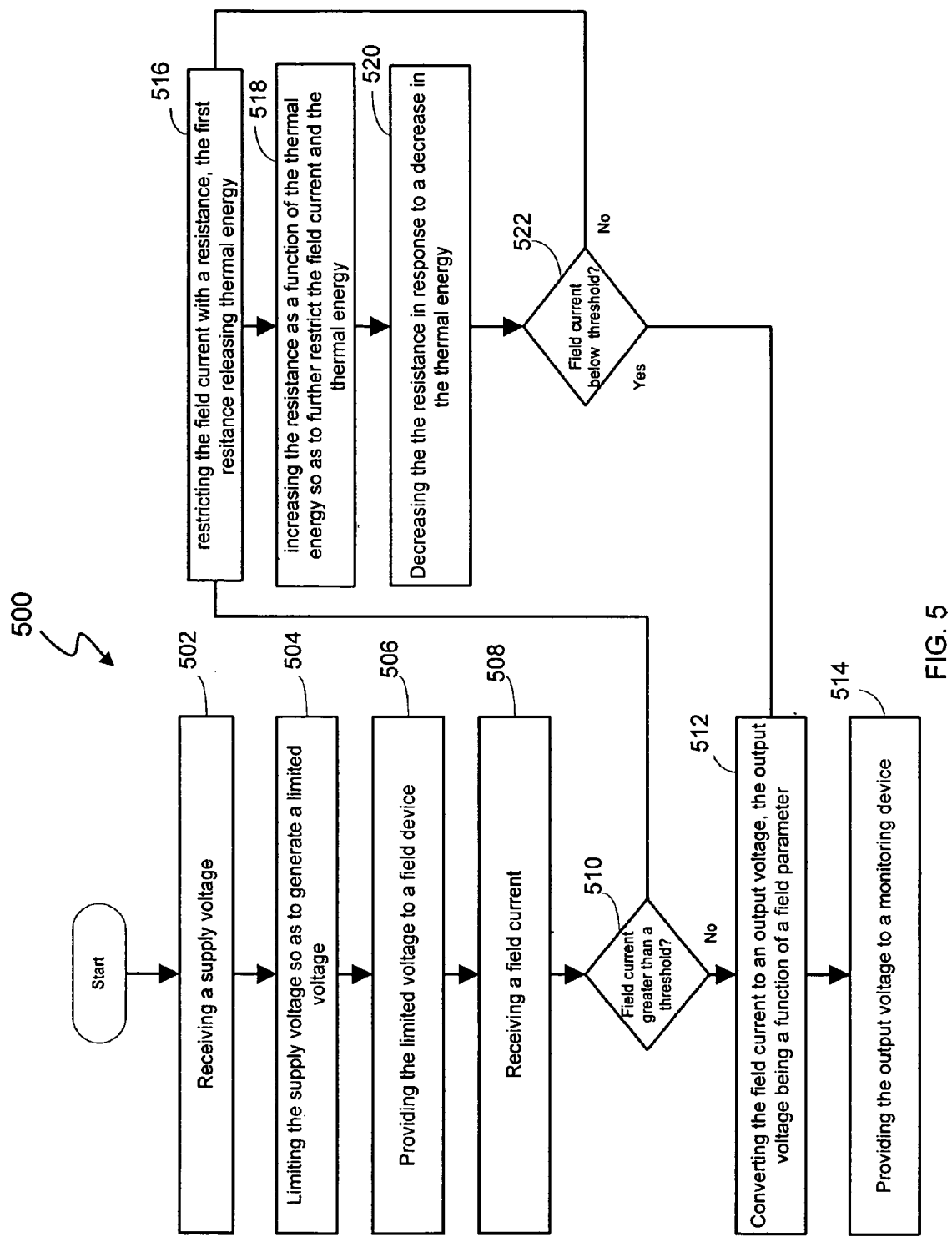
FIG. 5 is a flow chart illustrating steps carried out by the energy-limiting modules of FIGS. 2, 3 and 4 according to several embodiments of the present invention.

Referring next to FIG. 5, shown is a flow chart depicting steps carried out by the energy-limiting modules of FIGS. 2, 3 and 4 in accordance with an exemplary embodiment of the present invention. As shown, the energy-limiting module 202, 300, 400 initially receives a supply voltage 204, 304, 402 (Step 502), and limits the supply voltage 204, 304, 402 so as to generate a limited voltage 212, 310, 408 (Step 504), which is provided to a field device 208, 312, 410 (Step 506).

In response, the field device 208, 312, 410 draws a field current (e.g., in proportion to a monitored parameter), which is then received by the energy-limiting module 202, 300, 400 (Step 508) on the return signal line 214, 316, 416. If the received field current is less than a threshold (e.g., 20 mA) (Step 510), the field current is converted to an output voltage 210, 320, 420, which is a function of the monitored parameter (Step 512), and the output voltage 210, 320, 420 is provided to the programmable controller 102 (Step 514). The threshold in several embodiments depends upon an upper range of current normally drawn by the field devices 106, 208, 312, 410. For example, if the field devices 106, 208, 312, 410 normally draw a maximum of 20 mA, then field currents above 20 mA are likely due to a fault situation.

In the event of a fault (e.g., the supply signal line 212, 310, 408 is shorted with the return signal line 214, 316, 416 or the supply signal line 212, 310, 408 is grounded), the field current in the return signal line 214, 316, 416 will rise beyond the threshold (e.g., 20 mA)(Step 510), and the temperature controlled current limiter 302, 406 will restrict the field current with its resistance while releasing thermal energy (Step 516). As the temperature controlled current limiter 302, 406 releases thermal energy, its resistance increases as a function of the amount of thermal energy so as to further restrict the field current, and hence, the amount of thermal energy generated (Step 518).

As the thermal energy of the temperature controlled current limiter 302, 406 decreases, its resistance also decreases (Step 520), and once the field current is below a threshold (e.g., because the fault condition is no longer present) (Step 522), the output voltage 210, 320, 420 provided to the programmable controller 102 is again a function of a monitored parameter (Steps 512, 514).

Although the invention herein disclosed has been described by means of specific embodiments and applications thereof, numerous modifications and variations could be made thereto by those skilled in the art without departing from the principles of the invention.

What is claimed:

1. An apparatus for controlling temperature, voltage and energy in an industrial process controller, comprising:
    a PTC device having an input disposed to be coupled to a voltage source;
    a first zener diode having a negative terminal coupled to an output of the PTC device and a field device output terminal, and a positive terminal coupled to a V- reference terminal;
    a second zener diode having a positive terminal coupled to the V- reference terminal and a negative terminal coupled to a field device input terminal; and
    a resistor coupled between the field device input terminal and the V- reference terminal so as to generate an output voltage signal proportional to a field current provided from the field device.

2. The apparatus of claim 1 wherein the PTC device has a resistance versus temperature characteristic defined by an approximately constant resistance versus temperature relationship below a predetermined threshold temperature and an increasing resistance versus temperature characteristic above the predetermined threshold temperature.

3. The apparatus of claim 2 wherein the predefined threshold temperature is approximately 120 degrees celsius.

4. The apparatus of claim 1 wherein the PTC device has a nominal resistance of approximately 250 ohms below the predetermined threshold temperature and an increasing resistance value above the predetermined threshold temperature.

5. The apparatus of claim 1 further comprising a processor coupled to the field device output terminal and an actuator coupled to the processor, wherein the processor is disposed to provide a control signal to the actuator responsive to an output of the field device.

6. The apparatus of claim 1 further comprising the field device and wherein the field device comprises a transducer.

7. The apparatus of claim 6 wherein the transducer is selected from a group consisting of a temperature transducer, a pressure transducer and a flow transducer.

8. The apparatus of claim 3 wherein the apparatus is configured to be in installed in a explosive gaseous environment, and wherein the predefined threshold temperature is selected based on the flash point of a gaseous component of the gaseous environment.

9. A system for controlling a process in an explosive environment, comprising:
 a field device disposed to sense a parameter of the process;
 a sensor sub-system disposed to control the operation of the field device, the sensor sub-system comprising:
 a PTC device having an input disposed to be coupled to a voltage source;
 a first zener diode having a negative terminal coupled to an output of the PTC device and an output terminal of the field device, and a positive terminal coupled to a V- reference terminal;
 a second zener diode having a positive terminal coupled to the V- reference terminal and a negative terminal coupled to an input terminal of the field device; and
 a resistor coupled between the input terminal of the field device and the V- reference terminal so as to generate an output voltage signal proportional to a field current provided from the field device; and
 a processor sub-system coupled to the field device.

10. The system of claim 9 further comprising an actuator coupled to the processor.

11. The system of claim 9 wherein the PTC device has a resistance versus temperature characteristic defined by an approximately constant resistance versus temperature relationship below a predetermined threshold temperature and an increasing resistance versus temperature characteristic above the predetermined threshold temperature.

12. The system of claim 9 wherein the predefined threshold temperature is approximately 120 degrees celsius.

13. The system of claim 9 wherein the predefined threshold temperature is selected based on the flash point of a gaseous component of the gaseous environment.

\* \* \* \* \*